United States Patent
Shinojima et al.

(10) Patent No.: US 8,750,877 B2
(45) Date of Patent: Jun. 10, 2014

(54) BASE STATION FOR TRANSFERRING DATA IN SWITCHING AMONGST MULTIPLE COMMUNICATION METHODS OF A MOBILE DEVICE

(75) Inventors: Ryota Shinojima, Yokosuka (JP); Hiroyuki Fujii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/592,499

(22) Filed: Aug. 23, 2012

(65) Prior Publication Data
US 2013/0079008 A1    Mar. 28, 2013

(30) Foreign Application Priority Data
Sep. 22, 2011    (JP) .................................. 2011-207068

(51) Int. Cl.
  *H04W 36/00* (2009.01)
  *H04W 4/00* (2009.01)
(52) U.S. Cl.
  USPC .......................................... 455/436; 370/331
(58) Field of Classification Search
  USPC ................... 455/436, 438, 439, 442; 370/331
  See application file for complete search history.

(56) References Cited

U.S. PATENT DOCUMENTS

| | | | |
|---|---|---|---|
| 2007/0036109 A1* | 2/2007 | Kwak et al. | 370/331 |
| 2007/0286125 A1* | 12/2007 | Lee et al. | 370/331 |
| 2009/0245201 A1* | 10/2009 | Motegi et al. | 370/331 |
| 2009/0253434 A1 | 10/2009 | Hayashi et al. | |
| 2010/0067489 A1 | 3/2010 | Pelletier et al. | |
| 2010/0260147 A1* | 10/2010 | Xing et al. | 370/332 |
| 2011/0013594 A1* | 1/2011 | Zhao et al. | 370/331 |
| 2011/0195716 A1* | 8/2011 | Hapsari et al. | 455/436 |
| 2011/0306308 A1* | 12/2011 | Tooyama et al. | 455/68 |
| 2011/0317658 A1* | 12/2011 | Tooyama et al. | 370/331 |

FOREIGN PATENT DOCUMENTS

| | | |
|---|---|---|
| JP | 2010-522466 | 7/2010 |
| JP | 2011-15306 | 1/2011 |
| WO | 2008/114449 | 9/2008 |

* cited by examiner

*Primary Examiner* — Christopher M Brandt
(74) *Attorney, Agent, or Firm* — Katten Muchin Rosenman LLP

(57) ABSTRACT

A base station, including a memory which stores data to be transmitted to a mobile device, which complies with multiple communication methods and performs a data communication with the base station, and a processor which switches, during transmission of the data stored in the memory with one communication method of the multiple communication methods, when a communication request with another communication method of the multiple communication methods is transmitted to the mobile device, a communication partner to another base station complying with the other communication method, and determines whether to transfer an unsent data to the other base station based on a size relationship between a data transmission time to transmit the unsent data stored in the memory to the other base station and a communication time predicted based on a past communication history regarding a communication destination which transmits the communication request.

8 Claims, 18 Drawing Sheets

| | USER ID | CALL DESTINATION | CALL TIME [S] | DATE |
|---|---|---|---|---|
| 1 | aaaabbbb | xxxxyyyy | 10 | 20yy/xx/aa:bb:cc |
| 2 | bbbbaaaa | yyyyzzzz | 100 | 20yy/xx/aa:bb:dd |
| 3 | aaaacccc | xxxxzzzz | 50 | 20yy/xx/aa:bb:ee |
| 4 | aaaabbbb | xxxxyyyy | 30 | 20yy/xx/aa:bb:ff |

Columns: 145, 146, 147, 148. Rows: 141, 142, 143, 144.

| | USER ID | CELL NUMBER | DATE | TRIGGER |
|---|---|---|---|---|
| 1 | aaaabbbb | FFF0 | 20yy/xx/aa:bb:cc | DIALING |
| 2 | bbbbaaaa | FFF1 | 20yy/xx/aa:bb:dd | HANDOVER |
| 3 | aaaacccc | FFF2 | 20yy/xx/aa:bb:ee | DIALING |

Columns: 145, 154, 148, 155. Rows: 151, 152, 153.

| EXISTING INFORMATION | |
|---|---|
| 91 ~ | |
| [NEWLY ADDED INFORMATION] | |
| 92 ~ | CALL TYPE |
| 93 ~ | MAXIMUM COMMUNICATION RATE IN 3G |

| EXISTING INFORMATION | |
|---|---|
| 94 ~ | |
| [NEWLY ADDED INFORMATION] | |
| 92 ~ | CALL TYPE |
| 93 ~ | MAXIMUM COMMUNICATION RATE IN 3G |
| 96 ~ | AVERAGE CALL TIME |

| | EXISTING INFORMATION |
|---|---|
| 77 | ... |
| | [NEWLY ADDED INFORMATION] |
| 78 | AVERAGE CALL TIME |
| 79 | MOVEMENT PRESENCE/ABSENCE |
| 80 | LTE COMMUNICATION SPEED |

| | EXISTING INFORMATION |
|---|---|
| 74 | ... |
| | [NEWLY ADDED INFORMATION] |
| 75 | CALL TYPE |
| 76 | MAXIMUM COMMUNICATION RATE IN 3G |

| | EXISTING INFORMATION |
|---|---|
| 81 | ... |
| | [NEWLY ADDED INFORMATION] |
| 82 | DATA PRESENCE/ABSENCE FLAG |

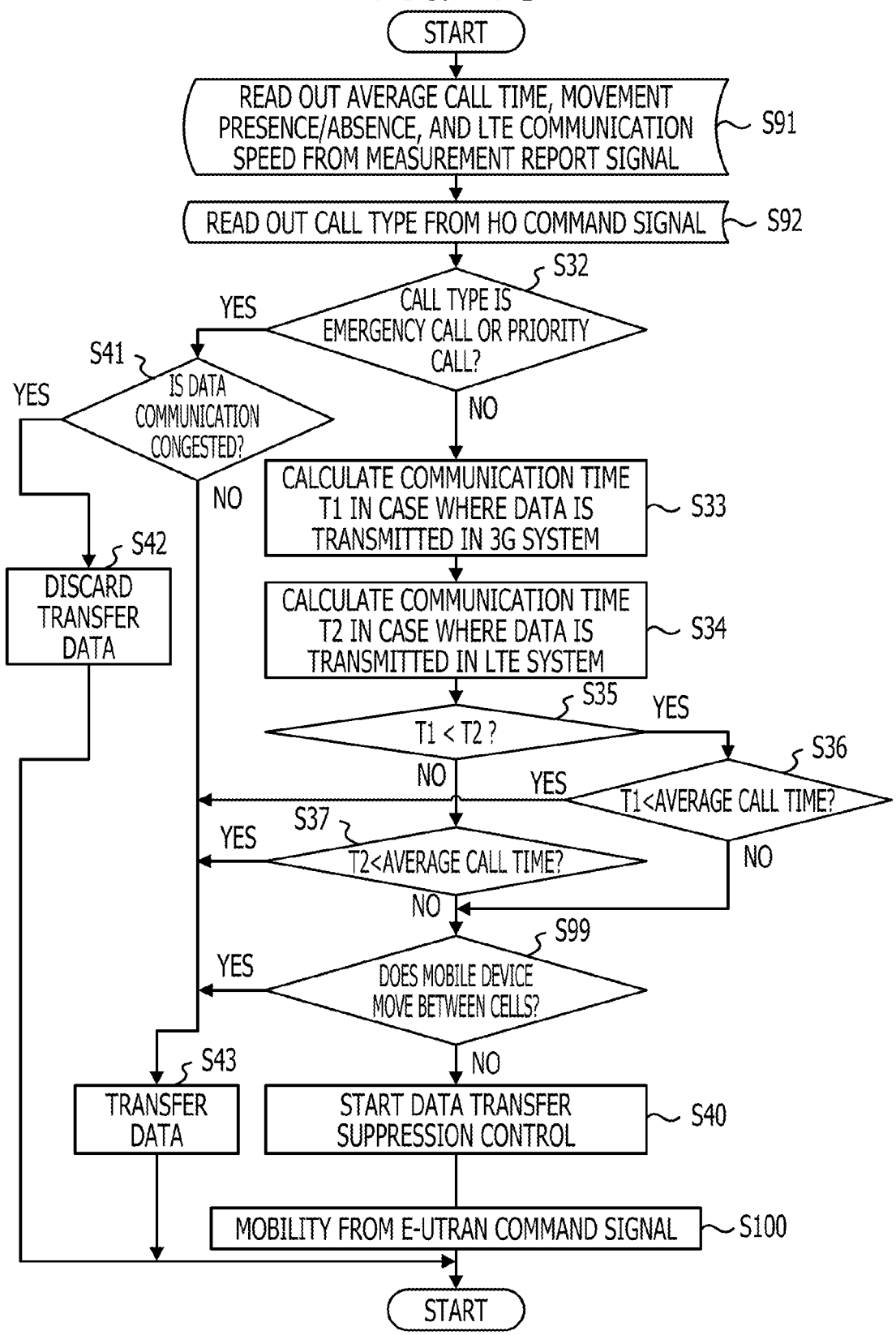

US 8,750,877 B2

BASE STATION FOR TRANSFERRING DATA IN SWITCHING AMONGST MULTIPLE COMMUNICATION METHODS OF A MOBILE DEVICE

CROSS-REFERENCE TO RELATED APPLICATIONS

This application is based upon and claims the benefit of priority from the prior Japanese Patent Application No. 2011-207068 filed on Sep. 22, 2011, the entire contents of which are incorporated herein by reference.

FIELD

The embodiments discussed herein are related to a connection destination switching between base stations that perform radio communication by different communication methods.

BACKGROUND

A mobile device complying with various communication methods switches base stations as a communication target according to the communication method. For example, the mobile device performs voice communication with a base station complying with 3rd Generation (3G) and performs data communication with a base station complying with Long Term Evolution (LTE).

If a voice call is generated during the data communication with an LTE base station, an LTE system performs Inter-Radio Access Technology (RAT) handover with respect to a 3G system. The Inter-RAT handover is handover performed between different communication methods. In the LTE system, control for enabling a voice call in combination with the 3G system is referred to as Circuit Switched (CS) Fallback control.

In a radio communication system in which the CS Fallback control is performed, if the Inter-RAT handover from the LTE system to the 3G system occurs, the base station on the LTE system side transfers data, which is not yet sent to a mobile device, to the base station on the 3G system side. Due to the above-described transfer, the radio communication system may prevent a loss of the data received on the LTE system side by the mobile device before the transfer. The transfer of the unsent data in the Inter-RAT handover is referred to as data forwarding. For example, International Publication Pamphlet No. WO 2008/114449, Japanese National Publication of International Patent Application No. 2010-522466, and Japanese Laid-open Patent Publication No. 2011-15306 disclose techniques related to the data forwarding in the handover between base stations.

SUMMARY

According to an aspect of the invention, a base station, including a memory which stores data to be transmitted to a mobile device, which complies with multiple communication methods and performs a data communication with the base station, and a processor which switches, during transmission of the data stored in the memory with one communication method of the multiple communication methods, when a communication request with another communication method of the multiple communication methods is transmitted to the mobile device, a communication partner to another base station complying with the other communication method, and determines whether to transfer an unsent data to the other base station based on a size relationship between a data transmission time to transmit the unsent data stored in the memory to the other base station and a communication time predicted based on a past communication history regarding a communication destination which transmits the communication request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 7A is a table diagram of a call history data 111 stored in a memory 34 of the MME 3;

FIG. 7B is a table diagram of a management table 104 stored in a memory 47 of the eNB 6;

FIG. 9A is a configuration diagram of a forward relocation response signal 90 transmitted to the MME 3 from the SGSN 2;

FIG. 9B is a configuration diagram of a handover command signal 100 transmitted to the eNB 6 from the MME 3;

FIG. 16A is a configuration diagram of a measurement report signal 170 transmitted to the eNB 6 from the mobile device 8a;

FIG. 16B is a configuration diagram of a handover command signal 100a transmitted to the eNB 6 from the MME 3;

FIG. 16C is a configuration diagram of a mobility from E-UTRAN command signal 180 transmitted to the mobile device 8a from the eNB 6;

FIG. 18 is a flowchart of data transfer determining processing in the eNB 6.

DESCRIPTION OF EMBODIMENTS

The embodiments of the present application will be described below. The embodiments of the present invention include combinations of configurations according in the embodiments.

While inventing the present embodiments, observations were made regarding a related art. Such observations include the following, for example.

In a radio communication system of the related art, data as a target of data forwarding is transmitted to a mobile device from a base station in parallel with a voice call in the 3G system. At the end of the voice call, if the data transmission from the base station on the 3G system side to the mobile device is not completed, the unsent data in the 3G system is subjected to the data forwarding from the 3G system to the LTE system once more. The above-described data forwarding that is not generally desired, load of a network in the radio communication system increases.

Figure 1:
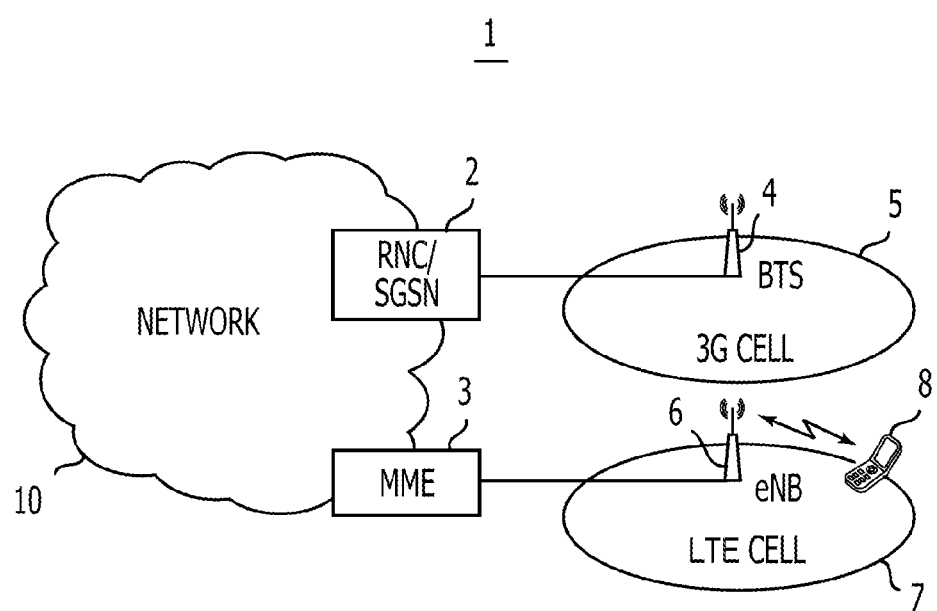
FIG. 1 is a block diagram of a radio communication system 1.

FIG. 1 is a block diagram of a radio communication system 1. In FIG. 1, the radio communication system 1 includes a Serving GPRS Support Node (SGSN) 2, a Mobility Management Entity (MME) 3, a Base Transceiver Station (BTS) 4, an evolved Node B (eNB) 6, a mobile device 8, and a network 10. A cell 5 indicates a cell range of the BTS 4. A cell 7 indicates a cell range of the eNB 6. Each cell is assigned with a specific cell number.

The BTS 4 is a base station that complies with the 3G method. The BTS 4 performs communication with the mobile device 8 in the range of the cell 5. The SGSN 2 is a node that provides a function such as transfer management of the mobile device 8. The SGSN 2 is wired connected to the BTS 4. The SGSN 2 forms a 3G system in collaboration with the BTS 4.

The eNB 6 is a base station that complies with the LTE method. The eNB 6 performs data communication with the mobile device 8 in the range of the cell 7. The MME 3 is a node that provides a function such as mobility control. The MME 3 is wired connected to the eNB 6. The MME 3 forms an LTE system in collaboration with the eNB 6.

The mobile device 8 is a radio terminal that is radio-communicable by one of the 3G method and the LTE method and that complies with different communication methods. If the mobile device 8 is in the range of the cell 5, the mobile device 8 may access the network 10 through the BTS 4 and the SGSN 2 by the 3G method. If the mobile device 8 is in the range of the cell 7, the mobile device 8 may access the network 10 through the eNB 6 and the MME 3 by the LTE method.

At a time of arrival of a voice call, the mobile device 8 receives data from the eNB 6. If the mobile device 8 receives a voice call request in the radio communication system 1, the MME 3 transmits a paging signal of the voice call to the mobile device 8 through the eNB 6. At a time of transmission of a voice call, the paging signal is not transmitted from the MME 3 to the mobile device 8, and the mobile device 8 is a trigger.

After receiving the paging signal, the mobile device 8 starts the Inter-RAT handover processing from the eNB 6 to the BTS 4. At a time of occurrence of the handover processing, if the data being transmitted to the mobile device 8 remains in the eNB 6, the eNB 6 determines whether to transfer the remaining data to the BTS 4 based on a data communication speed and a remaining data size in the LTE system and the 3G system. The transfer processing of the remaining data will be described in detail below.

As described above, if there is a call request during the data transmission by the LTE method, the radio communication system 1 may switch the communication method of the mobile device 8 to the 3G method and determine whether to transfer the remaining data that is being transmitted to the BTS 4 from the eNB 6.

Figure 2:
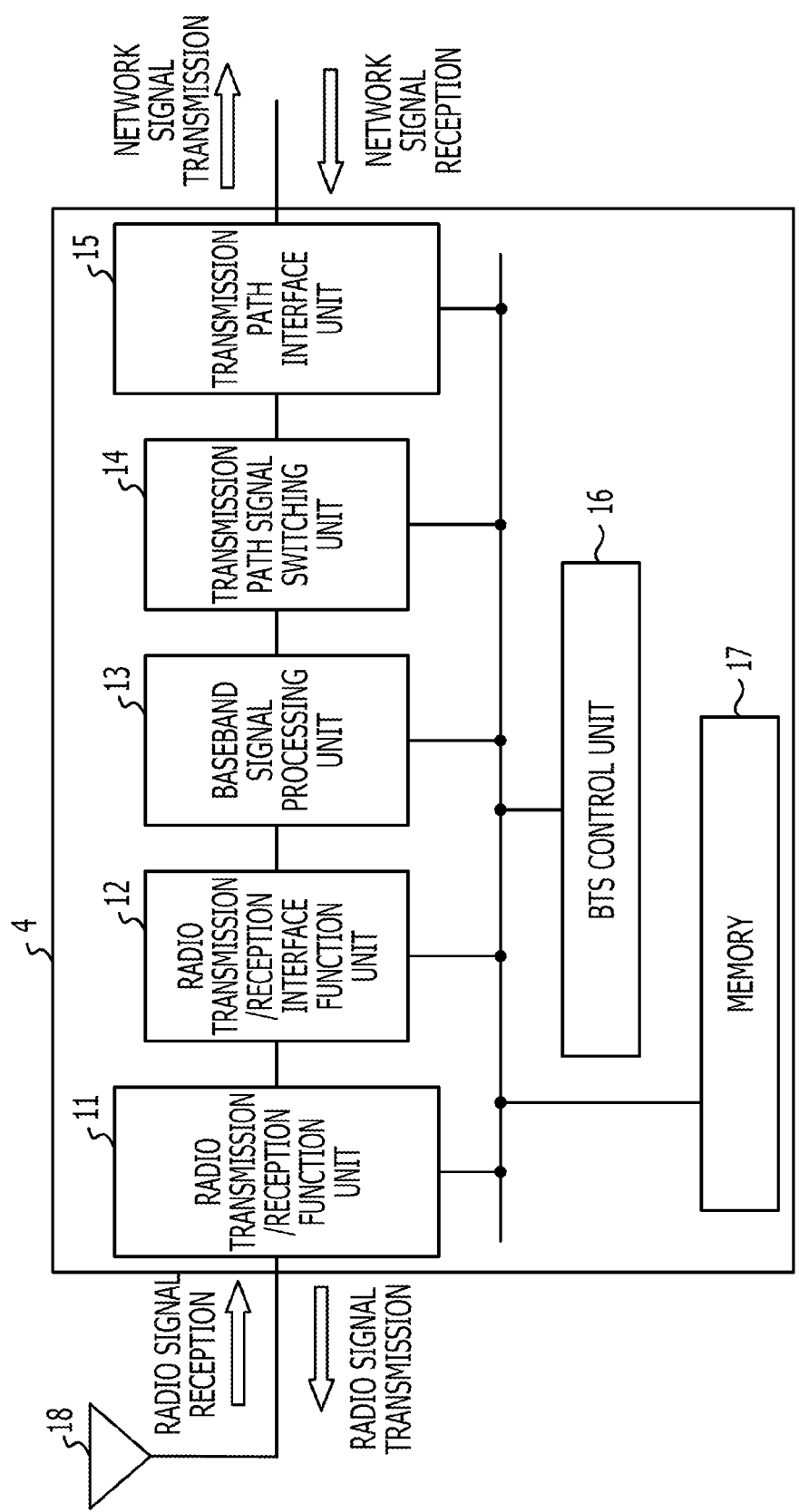
FIG. 2 is a hardware block diagram of a BTS 4.

FIG. 2 is a hardware block diagram of the BTS 4. The BTS 4 includes a radio transmission/reception function unit 11, a radio transmission/reception interface function unit 12, a baseband signal processing unit 13, a transmission path signal switching unit 14, a transmission path interface unit 15, a BTS control unit 16, a memory 17, and an antenna 18.

The radio transmission/reception function unit 11 is connected to the radio transmission/reception interface function unit 12. The radio transmission/reception interface function unit 12 is connected to the baseband signal processing unit 13. The baseband signal processing unit 13 is connected to the transmission path signal switching unit 14. The transmission path signal switching unit 14 is connected to the transmission path interface unit 15. The radio transmission/reception function unit 11, the radio transmission/reception interface function unit 12, the baseband signal processing unit 13, the transmission path signal switching unit 14, the transmission path interface unit 15, the BTS control unit 16, and the memory 17 are connected with each other by a bus. The transmission path signal switching unit 14 is connected to the transmission path interface unit 15. The radio transmission/reception function unit 11, the radio transmission/reception interface function unit 12, the baseband signal processing unit 13, the transmission path signal switching unit 14, and the transmission path interface unit 15 may be separate modules or a single module. Each of the modules may be achieved in an integrated circuit such as, for example, an Application Specific Integrated Circuit (ASIC) or/and a processor such as, for example, a Central Processing Unit (CPU) or a Digital Signal Processor (DSP).

The antenna 18 transmits an RF signal as a radio wave and converts a reception radio wave into an RF signal. The radio transmission/reception function unit 11 performs power amplification at a time of transmission/reception of the RF signal. The radio transmission/reception interface function unit 12 performs converting processing of an analog signal and a digital signal and modulating/demodulating processing of the signals. The baseband signal processing unit 13 performs processing such as attaching information to a transmission signal and separating information with respect to a reception signal. The transmission path signal switching unit 14 performs conversion of an IP packet for transmission path propagation and a baseband signal to be transmitted on radio. The transmission path interface unit 15, which is connected to a transmission path such as Ethernet, processes a protocol to receive the IP packet. The BTS control unit 16 performs operation control of the BTS 4. The BTS control unit 16 may be achieved in an integrated circuit such as, for example, an ASIC or/and a processor such as, for example, a CPU or a DSP. The memory 17 stores programs and data desired for the control operation of the BTS control unit 16.

In the above-described configuration, the BTS 4 may perform radio communication with the mobile device 8.

Figure 3:
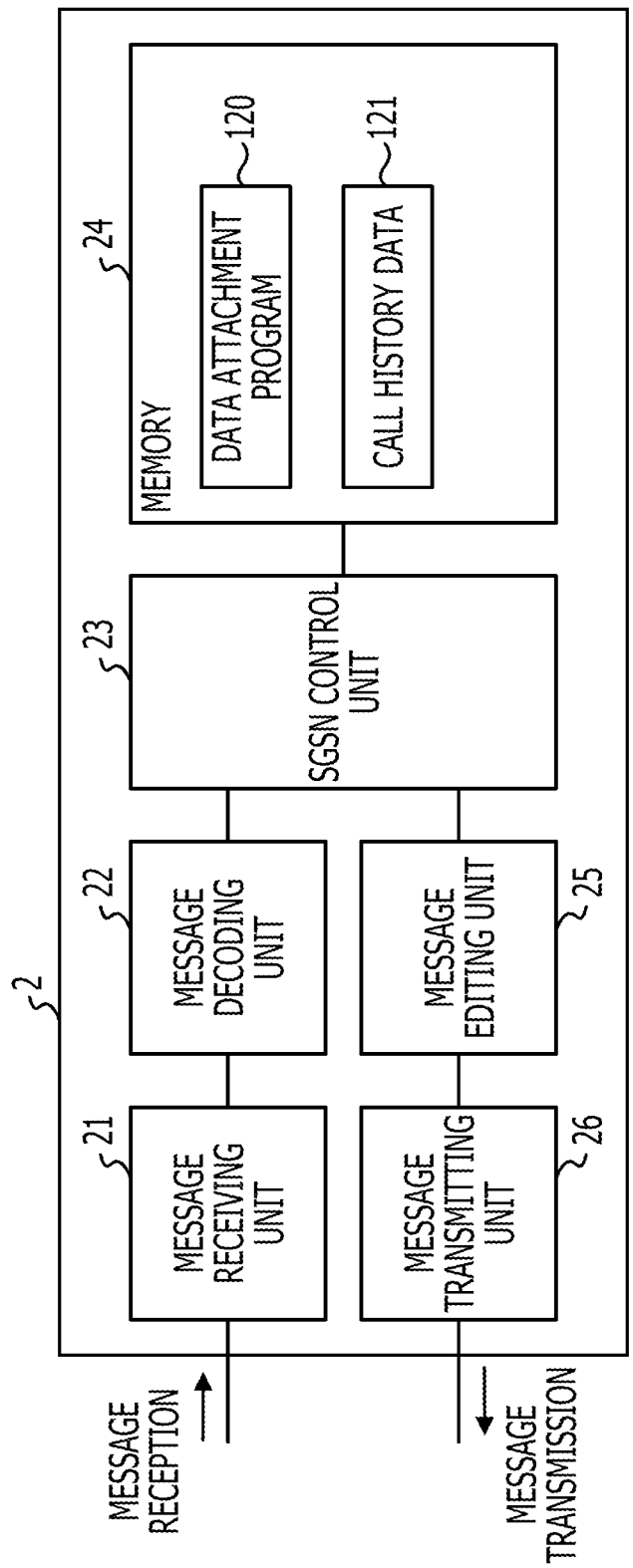
FIG. 3 is a hardware block diagram of an SGSN 2.

FIG. 3 is a hardware block diagram of the SGSN 2. The SGSN 2 manages a plurality of BTSs 4. The SGSN 2 includes a message receiving unit 21, a message decoding unit 22, an SGSN control unit 23, a memory 24, a message editing unit 25, and a message transmitting unit 26.

The message receiving unit 21 is connected to the message decoding unit 22. The message decoding unit 22 is connected to the SGSN control unit 23. The SGSN control unit 23 is connected to the message editing unit 25. The SGSN control unit 23 is connected to the message editing unit 25. The message editing unit 25 is connected to the message transmitting unit 26. The message receiving unit 21, the message decoding unit 22, the SGSN control unit 23, the message editing unit 25, and the message transmitting unit 26 may be separate modules or a single module. Each of the modules may be achieved in an integrated circuit such as, for example, an ASIC or/and a processor such as, for example, a CPU or a DSP.

The message receiving unit 21 receives messages transmitted from the plurality of BTSs 4. The message decoding unit 22 decodes the received messages. The SGSN control unit 23 decodes the reception message and performs editing processing of the transmission message. Further, the SGSN control unit 23 controls the operation of the SGSN 2 by reading out the program and the data stored in the memory 24. The memory 24 stores a data attachment program 120 and a call history data 121.

The data attachment program 120 is read out by the SGSN control unit 23 to perform processing for attaching call type information and maximum communication rate information received from the BTS 4. The call history data 121 is a table that stores a call history made through the SGSN 2. The SGSN 2 may regularly transmit the call history data 121 to the MME 3. By storing the call history made through the SGSN 2, the call history other than the call history by the handover from the LTE system to the 3G system may be stored. Therefore, if the call history is transmitted to the MME 3 and merged with a call history data 111 of the MME 3, prediction accuracy of the call time may be increased. The call history may be stored in the SGSN 2 or other higher-level devices.

Figure 4:
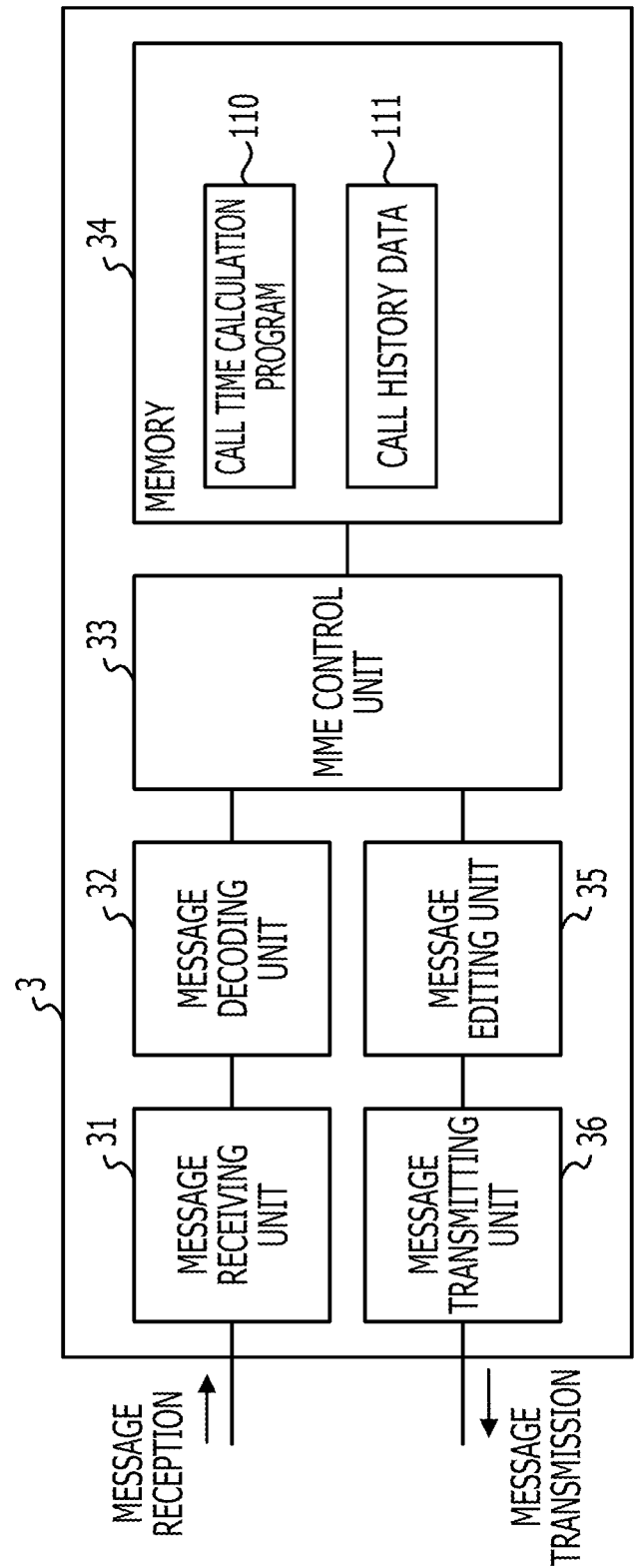
FIG. 4 is a hardware block diagram of an MME 3.

FIG. 4 is a hardware block diagram of the MME 3.

The MME 3 manages the plurality of eNBs 6. The MME 3 includes a message receiving unit 31, a message decoding unit 32, an MME control unit 33, a memory 34, a message editing unit 35, and a message transmitting unit 36.

The message receiving unit 31 is connected to the message decoding unit 32. The message decoding unit 32 is connected to the MME control unit 33. The MME control unit 33 is connected to the message editing unit 35. The MME control unit 33 is connected to the message editing unit 35. The message editing unit 35 is connected to the message transmitting unit 36. The message receiving unit 31, the message decoding unit 32, the MME control unit 33, the message editing unit 35, and the message transmitting unit 36 may be separate modules or a single module. Each of the modules may be achieved in an integrated circuit such as, for example, an ASIC or/and a processor such as, for example, a CPU or a DSP.

The message receiving unit 31 receives messages transmitted from the plurality of eNBs 6. The message decoding unit 32 decodes the received messages. The MME control unit 33 decodes the reception message and performs the editing processing of the transmission message. The MME control unit 33 controls the operation of the MME 3 by reading out the program and the data stored in the memory 34. The memory 34 stores a call time calculation program 110 and the call history data 111.

The call history data 111 is a table data that manages the call history between a call source and a call destination. The call time calculation program 110 is read out by the MME control unit 33 to calculate an average call time between the specific call source and call destination based on the call history data 111. The calculating processing of the call history data 111 and the average call time will be described in detail below.

As described above, the MME 3 may calculate the average call time based on the call history.

Figure 5:
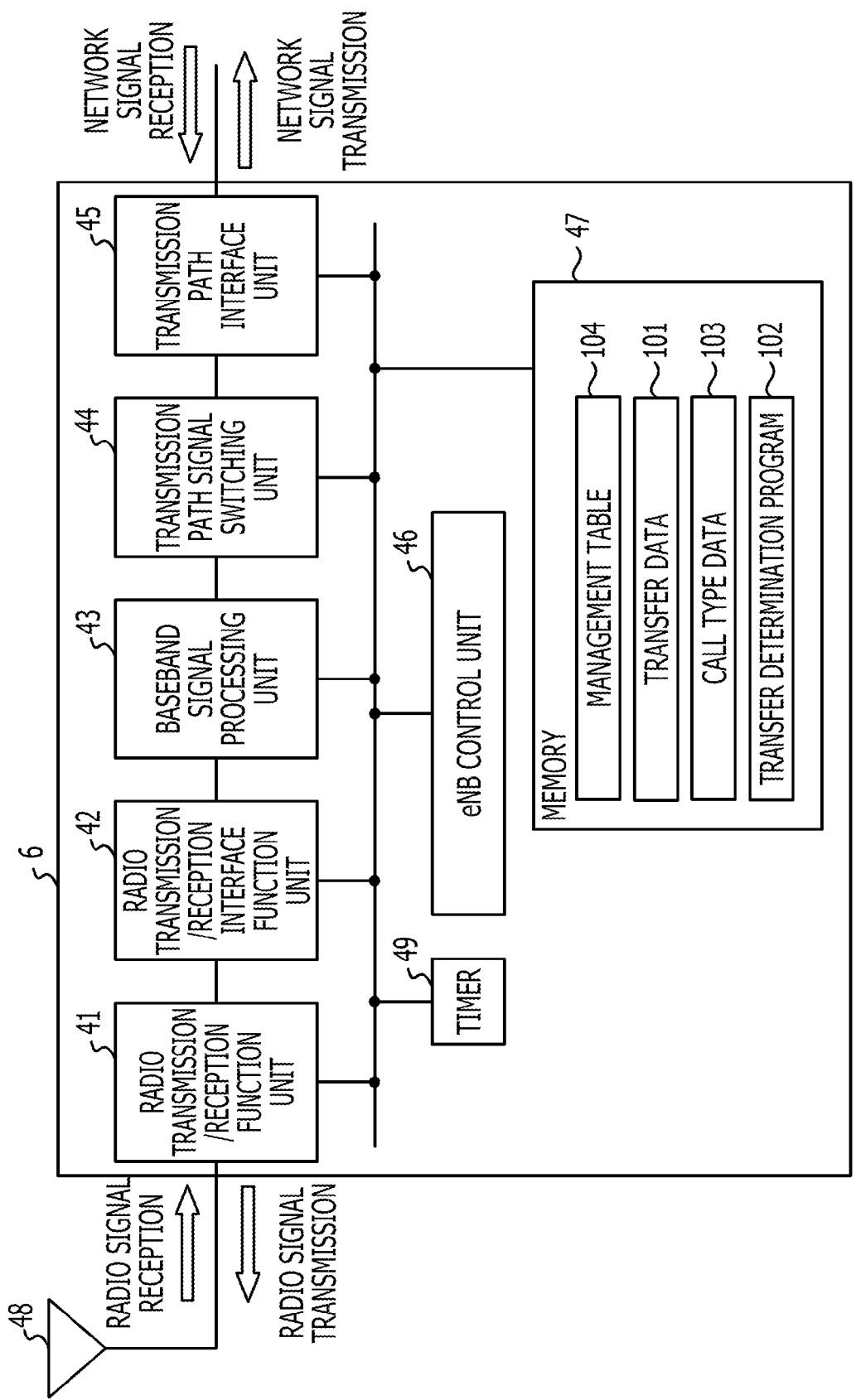
FIG. 5 is a hardware block of an eNB 6.

FIG. 5 is a hardware block diagram of the eNB 6. The eNB 6 includes a radio transmission/reception function unit 41, a radio transmission/reception interface function unit 42, a baseband signal processing unit 43, a transmission path signal switching unit 44, a transmission path interface unit 45, an eNB control unit 46, a memory 47, an antenna 48, and a timer 49.

The radio transmission/reception function unit 41 is connected to the radio transmission/reception interface function unit 42. The radio transmission/reception interface function unit 42 is connected to the baseband signal processing unit 43. The baseband signal processing unit 43 is connected to the transmission path signal switching unit 44. The transmission path signal switching unit 44 is connected to the transmission path interface unit 45. The radio transmission/reception function unit 41, the radio transmission/reception interface function unit 42, the baseband signal processing unit 43, the transmission path signal switching unit 44, the transmission path interface unit 45, the eNB control unit 46, the memory 47, and the timer 49 are connected with each other by a bus. The transmission path signal switching unit 44 is connected to the transmission path interface unit 45. The radio transmission/reception function unit 41, the radio transmission/reception interface function unit 42, the baseband signal processing unit 43, the transmission path signal switching unit 44, and the transmission path interface unit 45 may be separate modules or a single module. Each of the modules may be achieved in an integrated circuit such as, for example, an ASIC or/and a processor such as, for example, a CPU or a DSP.

The antenna 48 transmits the RF signal as a radio wave and converts the reception wave into an RF signal. The radio transmission/reception function unit 41 performs the power amplification at a time of transmission/reception of the RF signal. The radio transmission/reception interface function unit 42 performs the converting processing of the analog signal and the digital signal and the modulating/demodulating processing of the signals. The baseband signal processing unit 43 performs processing for attaching the information to the transmission signal and separating the information with respect to the reception signal. The transmission path signal switching unit 44 performs the conversion of the IP packet for transmission path propagation and the baseband signal to be transmitted on radio. The transmission path interface unit 45, which is connected to a transmission path such as Ethernet, and processes the protocol to receive the IP packet. The eNB control unit 46 performs the operation control of the eNB 6. The memory 47 includes a management table 104, a transfer data 101, a call type data 103, and a transfer determination program 102. The timer 49 measures a period of time that is set in advance. The timer 49 starts measuring the period of time in response to the control signal of the eNB control unit 46 and then transmits information related to the measurement time to the eNB 46.

The management table 104 is a data table that stores a cell number to which the mobile device 8 belongs for each event. The transfer data 101 is data that is temporally stored before being transmitted to the mobile device 8 from the eNB 6. The transfer data 101 is stored in associated with identification information such as a Temporary Mobile Subscriber Identity (TMSI) of the mobile device at the transmission destination so that the mobile device of the transmission destination may be specified. The call type data 103 is data to be referred to specify the call type of the call destination of a call request. The transfer determination program 102 determines whether to transfer the transfer data 101 to the BTS 4 based on the data size of the transfer data 101 and the call type of the communication destination. The processing of the transfer determination program 102 will be described in detail below.

As described above, the eNB 6 may determine whether to transfer the transfer data 101 to the BTS 4 based on various data.

Figure 6:
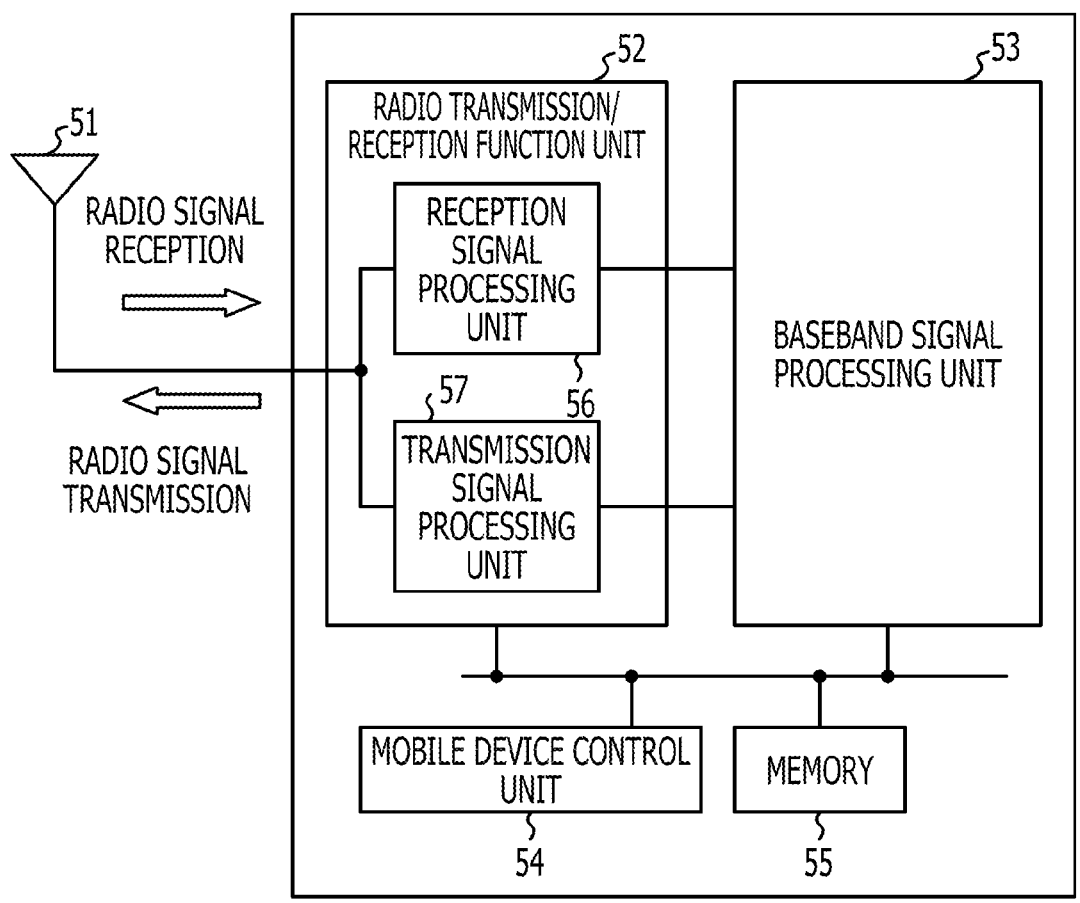
FIG. 6 is a hardware block of a mobile device 8 according to a first embodiment.

FIG. 6 is a hardware block diagram of the mobile device 8 according to the first embodiment. The mobile device 8 includes an antenna 51, a radio transmission/reception function unit 52, a baseband signal processing unit 53, a mobile device control unit 54, and a memory 55.

The antenna 51 transmits the RF signal as a radio wave and converts the reception radio wave into an RF signal. The radio transmission/reception function unit 52 performs the demodulating/modulating processing of the signal and the power amplification at a time of transmission/reception of the radio wave. The radio transmission/reception function unit 52 includes a reception signal processing unit 56 and a transmission signal processing unit 57. The reception signal processing unit 56 converts the radio signal received by the antenna 51 into the RF signal and converts the analog signal into the digital signal. The transmission signal processing unit 57 converts the RF signal into the radio signal to be transmitted by the antenna 51 and converts the digital signal into the analog signal.

The reception signal processing unit 56 and the transmission signal processing unit 57 are connected to the baseband signal processing unit 53. The radio transmission/reception function unit 52, the baseband signal processing unit 53, the mobile device control unit 54, and the memory 55 are connected with each other by a bus. The radio transmission/reception function unit 52, the baseband signal processing unit 53, the mobile device control unit 54, and the memory 55 may be separate modules or a single module. Each of the modules may be achieved in an integrated circuit such as, for example, an ASIC or/and a processor such as, for example, a CPU or a DSP.

The baseband signal processing unit 53 performs the processing for attaching the information to the transmission signal and separating the information with respect to the reception signal. The baseband signal processing unit 53 switches a plurality of communication methods according to setting from the outside. The mobile device control unit 54 performs the operation control of the mobile device 8. The mobile device control unit 54 controls the communication method for processing in the baseband signal processing unit 53. The memory 55 stores the program and data desired for the control operation of the mobile device control unit 54.

As described above, the mobile device 8 may perform the radio communication complying with the plurality of communication methods.

FIG. 7 is a table diagram of data that manages the information related to the call history of the mobile device 8. FIG. 7A is a table diagram of the call history data 111 stored in the memory 34 of the MME 3. FIG. 7 is a table diagram of the management table 104 stored in the memory 47 of the eNB 6.

In the call history data 111 illustrated in FIG. 7A, a line 145 indicates a user ID of a mobile device connected to the network 10 via the MME 3. The user ID may be, for example, an International Mobile Subscriber Identity (IMSI), a Temporary Mobile Subscriber Identity (TMSI), or the like as a subscriber identity assigned to the mobile device. A line 146 indicates the subscriber identity of the call destination of the mobile device with the user ID indicated in the line 145. A line 147 indicates a call time between the mobile device 8 indicated in the line 145 and the call destination indicated in the line 146. A line 148 indicates a call start time between the mobile device 8 indicated in the line 145 and the call destination indicated in the line 146. The call history data 121 stored in the memory 24 of the SGSN 2 also includes the data method that is equivalent to the call history data 111.

According to the call history data 111 illustrated in FIG. 7A, rows 141 to 144 indicate the call history for each user. For example, the row 141 indicates that the mobile device 8 with the user ID "aaaabbbb" was in a call state with the communication destination "xxxxyyyy" for ten seconds from hour bb: minute cc on day dd of month xx, year 20yy. The row 141 and the row 144 indicate that the average call time between the mobile device 8 with the user ID "aaaabbbb" and the communication destination "xxxxyyyy" is (10+30)/2=20 seconds.

According to the management table 104 illustrated in FIG. 7B, the line 145 and the line 148 include the information equivalent to the line 145 and the line 148 of the call history data 111. The row 154 is a cell number of the cell to which the mobile device communicating with the eNB 6 belongs. The row 155 is the operation content of the mobile device as a trigger for storing the information in the management table 104.

According to the management table 104 illustrated in FIG. 7B, rows 151 to 153 indicate operation management information for each user. For example, the row 151 indicates that the mobile device 8 with the user ID "aaaabbbb" belongs to the cell number "FFF0" and performed dialing operation on hour bb: minute cc on day aa of month xx, year 20yy. Every time the trigger is generated, the cell number corresponding to the user ID is stored, and the change of the cell number corresponding to the similar user ID is traced. This makes it possible to assume that the mobile device 8 with a certain user ID is moved.

As described above, with reference to the call history data 111 and the management table 104, the radio communication system 1 may obtain movement presence/absence of the mobile device 8 and an average call time between the mobile device 8 and a specific call destination.

Figure 8:
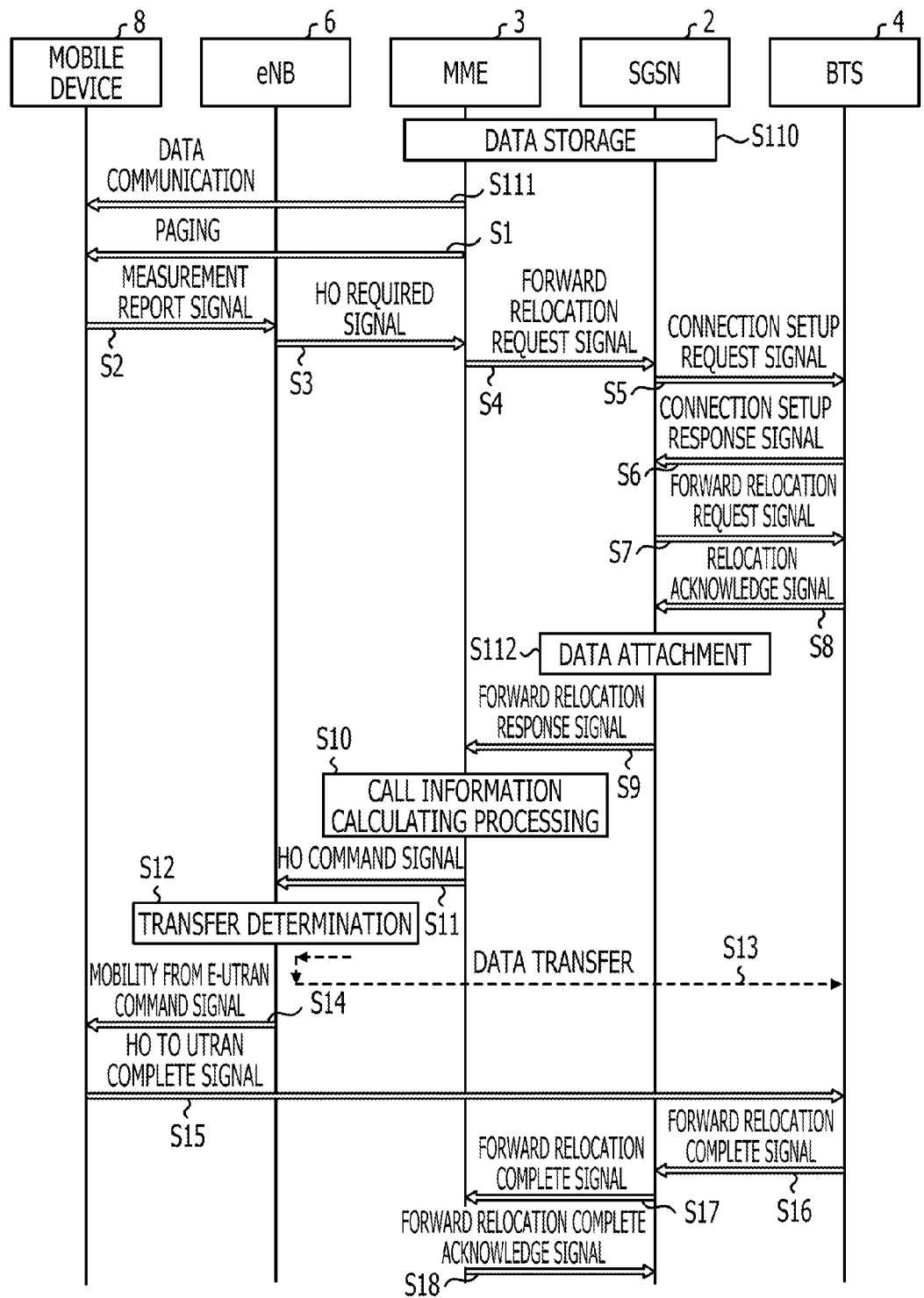
FIG. 8 is a sequence diagram of CS Fallback in the radio communication system 1 according to the first embodiment.

FIG. 8 is a sequence diagram of CS Fallback in the radio communication system 1 according to the first embodiment. The sequence diagram illustrated in FIG. 8 illustrates the processing performed after an incoming voice call is received during the data reception in the LTE system until the handover to the 3G system is completed.

The SGSN 2 and the MME 3 store the call destination and the call time, as call history data, for each voice call (S110). The MME 3 starts the data communication with the mobile device 8 in the LTE system (S111). The eNB 6 stores, in the management table 104, the cell number to which the mobile device 8 belongs at the time of starting the data communication, the call start time, and the trigger type (message reception, message transmission, and the like).

If a voice call request is transmitted from another mobile device on the network, the MME 3 performs paging with respect to the mobile device 8 during the data communication in the LTE system (S1). After receiving the paging signal, the mobile device 8 transmits a measurement report signal, in which the measurement report information such as a wave strength, a communication speed, and the like of the reception signal is set, to the eNB 6 (S2). The eNB 6 transmits a handover (HO) required signal to the MME 3 (S3).

Based on the measurement report, the MME 3 transmits a forward relocation request signal to the SGSN 2 in the 3G system (S4).

Based on the forward relocation request signal received from the MME 3, the SGSN 2 transmits a connection setup request signal to the BTS 4 that is communicable with the mobile device 8 (S5). After receiving the connection setup request signal, the BTS 4 transmits a connection setup response signal to the SGSN 2 if the BTS 4 is communicable with the mobile device 8 (S6). After receiving the connection setup request signal, the SGSN 2 transfers the forward relocation request signal received from the MME 3 to the BTS 4

(S7). After receiving the forward relocation request signal, the BTS 4 transmits a relocation acknowledge signal to the SGSN 2 (S8).

The SGSN 2 sets call type information in the 3G system and maximum communication rate information with respect to the mobile device 8 to the received relocation acknowledge signal (S112). The SGSN 2 transmits the relocation acknowledge signal, in which the call type information and the maximum communication rate information are set, as a forward relocation response signal to the MME 3 (S9).

The MME 3 refers to the call history data based on the forward relocation response signal, calculates the average call time by specifying a call destination, and performs call information calculating processing for specifying the call type such as an emergency call, a priority call, or the like (S10). The MME 3 transmits a handover (HO) command signal in which the call type information, the maximum communication rate information, and the calculated average call time information are set, to the eNB 6 (S11). The call information calculating processing will be described in detail below.

Based on the call type information stored in the received HO required signal, the maximum communication rate information, and the calculated average call time information, the eNB 6 performs the transfer determining processing for determine whether to transfer the data that is being transmitted to the mobile device 8 to the 3G system side at the arrival of a voice call (S12). The transfer determining processing will be described in detail below.

Depending on the results of the transfer determining processing, the eNB 6 transfers the data that is temporally stored in the memory 17 to the BTS 4 (S13). After the transfer processing is completed, the eNB 6 transmits a mobility from E-UTRAN command signal to the mobile device 8 (S14).

After receiving the mobility from E-UTRAN command signal, the mobile device 8 transmits a handover (HO) to UTRAN complete signal to the BTS 4 (S15). After receiving the HO to UTRAN complete signal, the BTS 4 transmits a forward relocation complete signal to the SGSN 2 (S16). The SGSN 2 transfers the received forward relocation complete signal to the MME 3 (S17). After receiving the forward relocation complete signal, the MME 3 releases a resource secured for the communication with the mobile device 8. When releasing the resource, the MME 3 transmits a forward relocation complete acknowledge signal to the SGSN 2 (S18).

As described above, according to the voice call destination in the 3G system, the radio communication system 1 determines whether to transfer the data that is temporally stored in the eNB 6 to the BTS 4. In the above-described data transfer processing, the handover between different communication methods may be achieved while preventing an increase of a network load that is not generally desired.

FIG. 9 is a configuration diagram of a message signal that transmits data for performance determination of the data transfer processing in CS Fallback according to the first embodiment. FIG. 9A is a configuration diagram of a forward relocation response signal 90 that is transmitted from the SGSN 2 to the MME 3. FIG. 9B is a configuration diagram of a HO command signal 100 that is transmitted from the MME 3 to the eNB 6.

In FIG. 9A, a data 91 represents information included in the existing forward relocation request signal. A data 92 and a data 93 represent information that is newly added as part of the forward relocation response signal 90 according to the first embodiment. The data 92 represents call type information of a voice incoming call as a target of the CS Fallback control. The data 93 represents maximum communication rate information in the 3G communication between the BTS 4 at the handover destination and the mobile device 8. By receiving the forward relocation response signal 90, the MME 3 may obtain the call type information and the maximum communication rate information in the 3G communication.

In FIG. 9B, a data 94 represents information included in the existing HO command signal. According to the first embodiment, the data 92, the data 93, and the data 96 represent information that is newly added as part of the HO command signal 100. As illustrated in FIG. 9A, the data 92 represents the call type information of an incoming voice call as a target of the CS Fallback control. As illustrated in FIG. 9A, the data 93 represents the maximum communication rate information in the 3G communication between the BTS 4 as the handover destination and the mobile device 8. The data 92 and the data 93 are equivalent to the data 92 and the data 93 in the forward relocation response signal 90. The data 96 represents the information of the average call time calculated by the MME 3. By receiving the HO command signal 100 illustrated in FIG. 9B, the eNB 6 may determine whether to transfer the data in the transfer determining processing in Operation S12.

Figure 10:
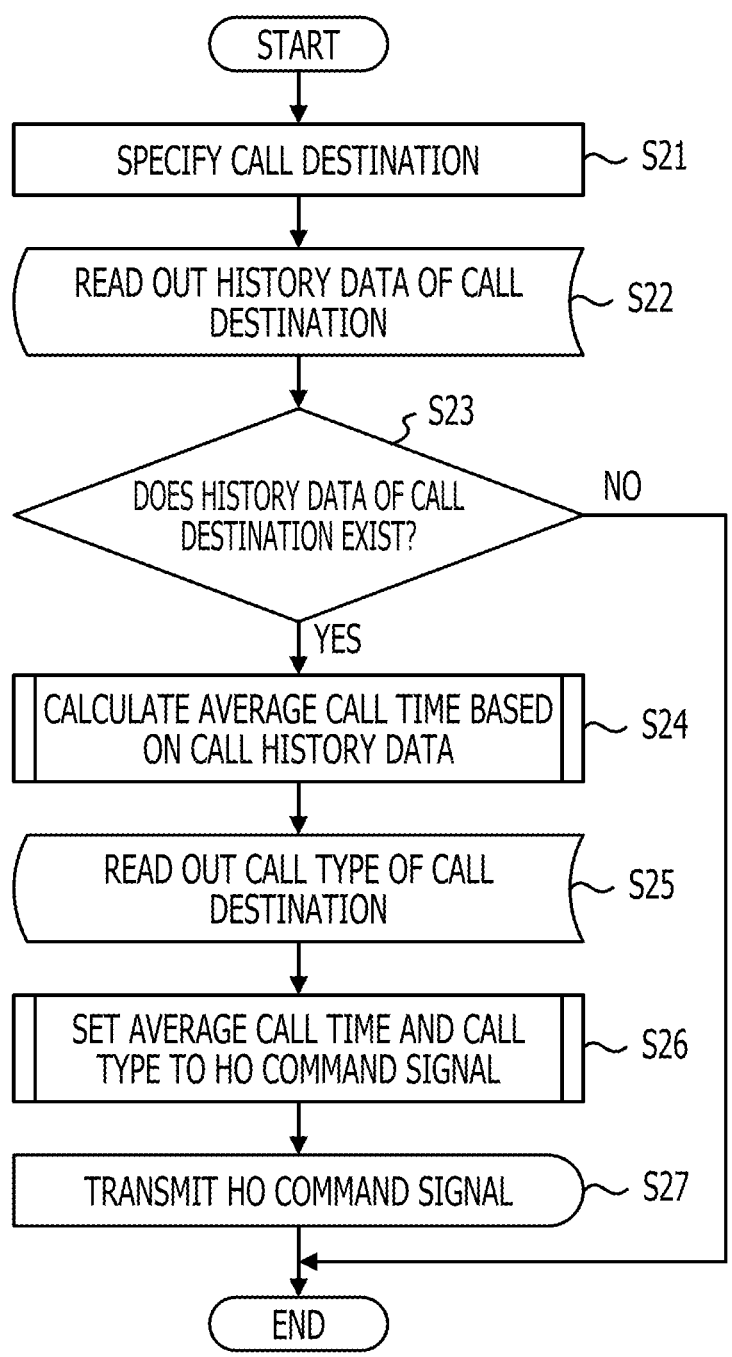
FIG. 10 is a flowchart of call time calculating processing in the MME 3.

FIG. 10 is a flowchart of the call time calculating processing in the MME 3. The flowchart illustrated in FIG. 10 corresponds to Operation S10 illustrated in FIG. 8. The call time calculating processing is achieved if the MME control unit 33 in the MME 3 executes the call time calculation program 110 stored in the memory 34.

Based on the forward relocation response signal 90 received from the SGSN 2, the MME control unit 33 specifies the call destination of the mobile device 8 that receives the voice call (S21). Based on the identification number such as a subscriber identification or the like of the specified call destination, the MME control unit 33 reads out the call history from the call history data 111 (S22).

If the corresponding call history exists in the call history data 111 (YES in S23), the MME control unit 33 calculates the average call time based on a plurality of read call history data 111 (S24). If the corresponding call history does not exist in the call history data 111 (NO in S23), the MME control unit 33 ends the call time calculating processing.

After calculating the average call time, the MME control unit 33 reads out the call type of the call destination from the forward relocation response signal 90 received from the SGSN 2 (S25). The MME control unit 33 sets the calculated average call time and the call type of the call destination to the HO command signal 100 (S26). The MME control unit 33 transmits the HO command signal 100, in which the calculated average call time and the call type of the call destination are set, to the eNB 6 (S27).

As described above, the MME 3 may calculate the average call time between the mobile device 8 and the call destination based on the forward relocation response signal 90 received from the SGSN 2.

Figure 11:
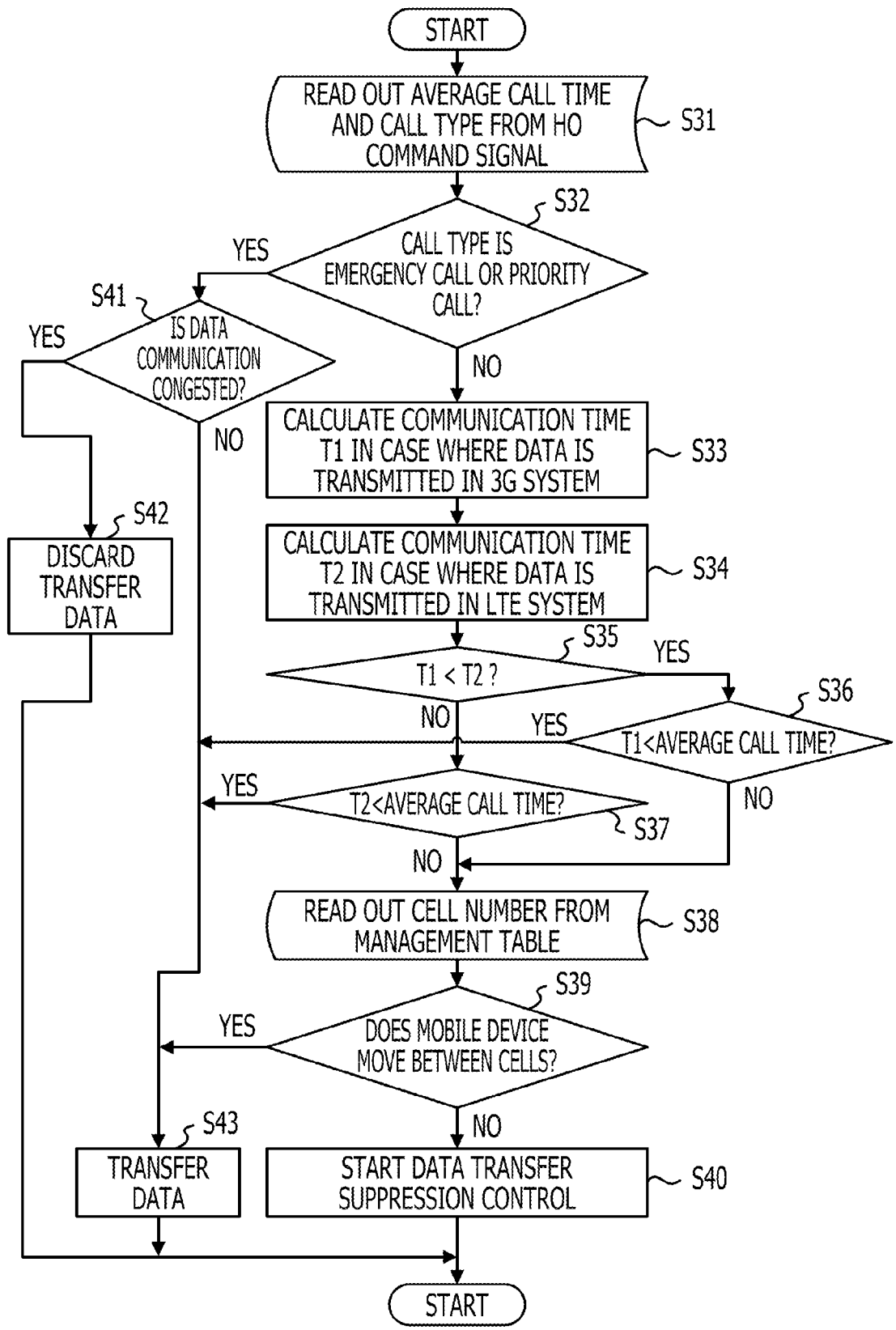
FIG. 11 is a flowchart of data transfer determining processing in the eNB 6.

FIG. 11 is a flowchart of the transfer determining processing in the eNB 6. The transfer determining processing illustrated in FIG. 11 corresponds to Operation S12 illustrated in FIG. 8. The transfer determining processing is achieved if the eNB control unit 46 in the eNB 6 executes the transfer determination program 102 stored in the memory 47.

The eNB control unit 46 reads out the information of the average call time 96 and the call type 92 from the HO command signal 100 received from the MME 3 (S31). Based on the call type data 103 stored in the memory 47, the eNB control unit 46 determines whether the read call type 92 is an emergency call or a priority call (S32).

If the read call type 92 is the emergency call or the priority call (YES in S32), the eNB control unit 46 determines whether the data communication is congested (S41). If the data communication is congested (YES in S41), the eNB control unit 46 discards the transfer data and ends the data transfer processing (S42). If the data communication is not congested (NO in S41), the eNB control unit 46 transfers the transfer data 101 that is temporally stored in the memory 47 to the BTS 4 and ends the data transfer processing (S43).

If the read call type 92 is not the emergency call or the priority call (NO in S32), the eNB control unit 46 calculates a communication time T1 in a case where the transfer data 101 is data-transmitted to the mobile device 8 in the 3G system based on the data size of the transfer data 101 temporally stored in the memory 47 and the maximum communication rate in the 3G system read out from the HO command signal 100 (S33). Based on the data size of the transfer data 101 temporally stored in the memory 47 and the past communication rate in the LTE system, the eNB control unit 46 calculates a communication time T2 in a case where the transfer data 101 is data-transmitted to the mobile device 8 in the LTE system (S34).

If the communication time T1 in the 3G system is shorter than the communication time T2 in the LTE system (YES in S35), the eNB control unit 46 compares the communication time T1 to the average call time read out from the HO command signal 100 (S36). If the communication time T1 is shorter than the average call time (YES in S36), the eNB control unit 46 performs the data transfer processing (S43). If the communication time T1 is equal to or longer than the average call time (NO in S36), the eNB control unit 46 transfers the process to the processing in Operation S38.

If the communication time T1 in the 3G system is equal to or longer than the communication time T2 in the LTE system (NO in S35), the eNB control unit 46 compares the communication time T2 to the average call time read out from the HO command signal 100 (S37). If the communication time T 2 is shorter than the average call time (YES in S37), the eNB control unit 46 performs the data transfer processing (S43). If the communication time T2 is equal to or longer than the average call time (NO in S37), the eNB control unit 46 transfers the process to the processing in Operation S38.

With reference to the management table 104 stored in the memory 47, the eNB control unit 46 reads out a cell number for each communication trigger of the mobile device 8 (S38). If the cell number for each communication trigger varies, it is determined that the mobile device 8 moves between the cells. Based on the comparison results of the cell numbers, if it is determined that the mobile device 8 moves between the cells (YES in S39), the eNB control unit 46 performs the data transfer processing (S43). If it is determined that the mobile device 8 does not move between the cells (NO in S39), the eNB control unit 46 starts data transfer suppression control (S40). Here, the data transfer suppression control is performed to suppress the performance of the data transfer processing for a certain period of time. If the mobile device 8 moves between the cells, a possibility that the mobile device 8 communicates with the original eNB 6 before handover is low. Thus, the data transfer processing is preferentially performed.

The eNB control unit 46 starts the data transfer suppression control and sets the timer 49 to measure a suppression time of the data transfer. The suppression time that is set to the timer 49 may be based on the average call time. The data transfer suppression control will be described in detail below.

As described above, the eNB 6 may determine whether to perform the data transfer processing to the BTS 4 based on the HO command signal 100 received from the MME 3.

Figure 12:
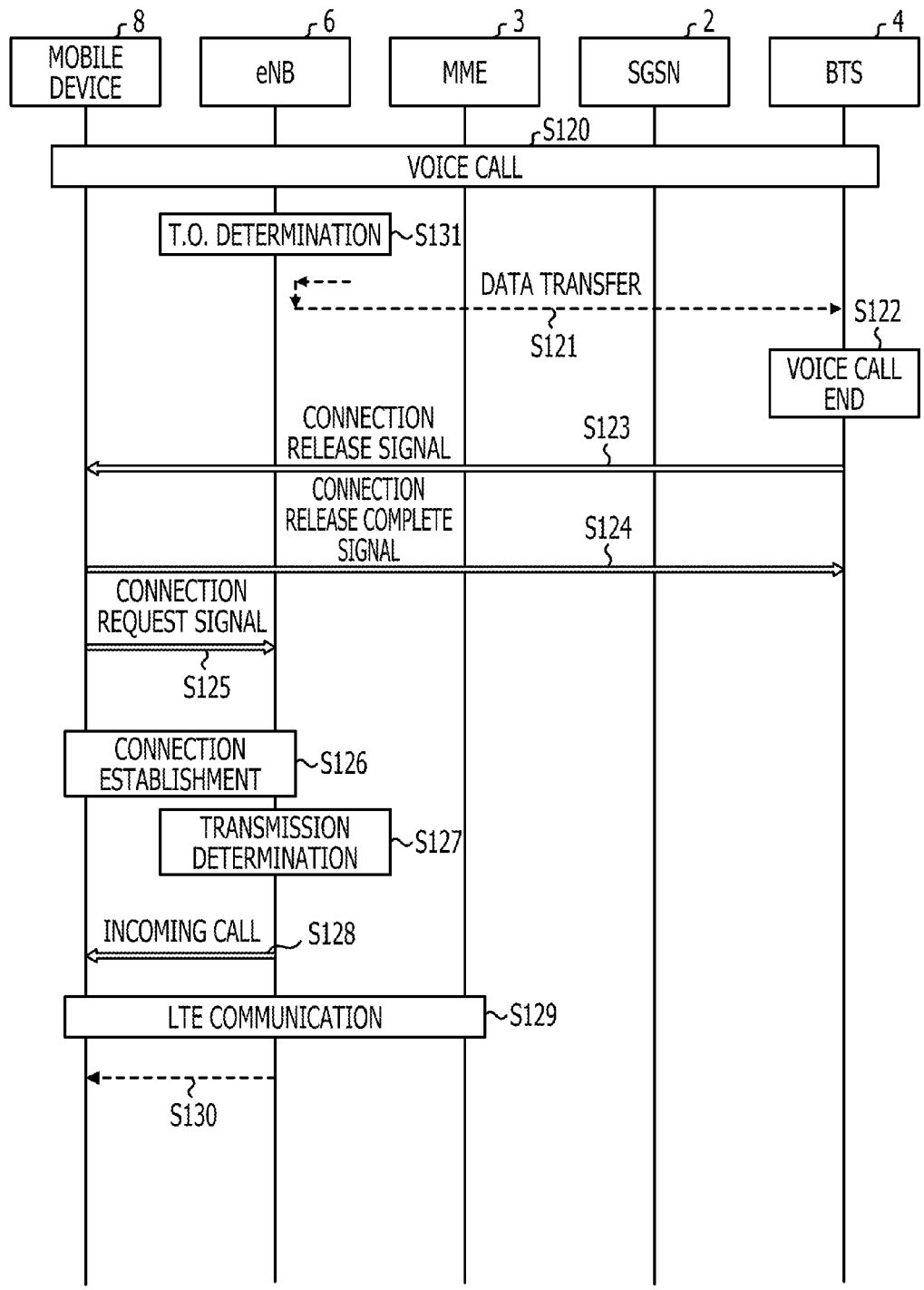
FIG. 12 is a sequence diagram after handover processing from an LTE system to a 3G system is completed.

FIG. 12 is a sequence diagram after the handover processing from the LTE system to the 3G system. In the sequence diagram illustrated in FIG. 12, the members equivalent to the sequence diagram illustrated in FIG. 8 are indicated with the similar numbers, so that the description is omitted.

After the handover processing to the 3G system is completed, the mobile device 8 performs the voice call processing with the BTS 4 (S120). If the eNB 6 determines not to perform the data based on the call history, the eNB 6 sets a timer to measure a certain period of time to perform timeout (T.O.) determination (S131). If a timeout is generated during the voice call, the eNB 6 transfer the data that is held in the eNB 6 to the BTS 4 (S121). If an actual call time is longer than a call time estimated based on the call history, the data transmission by the handover processing is prevented from being interrupted for a long time by transferring the data that is held in the eNB 6 to the BTS 4. The determining processing of timeout will be described in detail below.

If the voice call in the 3G system ends (S122), the BTS 4 transmits a connection release signal to the mobile device 8 (S123). After receiving the connection release signal, the mobile device 8 transmits a connection release complete signal to the BTS 4(S124). If the connection release complete signal is transmitted to the BTS 4, the voice call connection between the mobile device 8 and the BTS 4 in the 3G system ends.

The mobile device 8 transmits a connection request signal in the LTE system to the eNB 6 (S125). After the connection between the mobile device 8 and the eNB 6 is established (S126), the eNB 6 performs the determining processing for determine whether the transmission of the data, which is temporally stored before the handover processing, during the transmission is completed (S127). The determining processing will be described in detail below.

The eNB 6 transmits a paging signal to the mobile device 8 (S128). After receiving the paging signal, the mobile device 8 starts the data communication in the LTE system (S129). According to the transmission determination in Operation S127, if the data temporally stored before the switching to the 3G system remains, the eNB 6 transmits the remaining data to the mobile device 8 (S130).

As described above, based on a call time monitoring state even after the voice call starts, the eNB 6 may shorten the time, in which the data communication is interrupted, by transferring the remaining data to the 3G system side.

Figure 13:
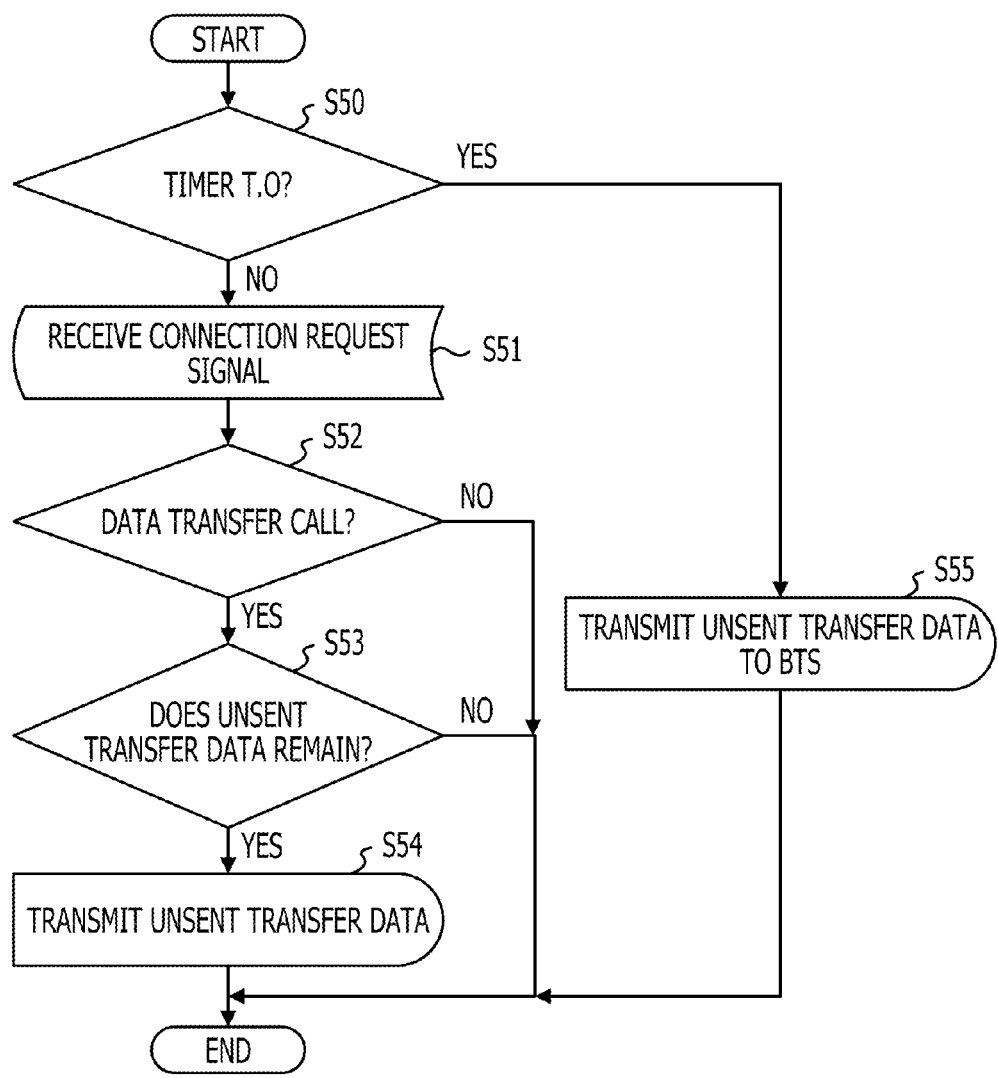
FIG. 13 is a data transfer processing flow after a timer operation starts in the eNB 6.

FIG. 13 is a data transfer processing flow after the timer operation starts in the eNB 6. The data transfer processing illustrated in FIG. 13 is achieved if the eNB control unit 46 executes the transfer determination program 102 stored in the memory 47.

As described above, according to the data transfer suppression control, the eNB control unit 46 sets the timer 49 to measure the suppression time of the data transfer. The eNB control unit 46 determines whether the timer 49 timeouts (S50). If the timer 49 timeouts (YES in S50), the eNB control unit 46 transmits the data temporally stored in the memory 47 to the BTS 4 (S55). If the timer 49 does not timeout (NO in S50), the eNB 6 receives the connection request signal from the mobile device 8 (S51).

After the connection request signal is received in Operation S51, based on the user identifier, if the connection request signal is determined to be a data transfer call (YES in S52), the eNB control unit 46 processes the processing to Operation S53. If the connection request signal is determined not to be the data transfer call (NO in S52), the eNB control unit 46 ends the data transfer processing.

In Operation S53, the eNB control unit 46 confirms whether unsent transfer data remains in the memory 47. If the unsent transfer data remains (YES in S53), the eNB control unit 46 transmits the unsent transfer data remaining in the memory 47 to the mobile device 8 (S54). If the unsent transfer data does not remain (NO in S53), the eNB control unit 46 ends the data transfer processing.

As described above, according to the data transfer suppression control, by determining the timeout of the data transfer, the eNB control unit 46 in the eNB 6 may transfer the data to the 3G system side if a certain period of time elapses after the data transfer suppression.

Figure 14:
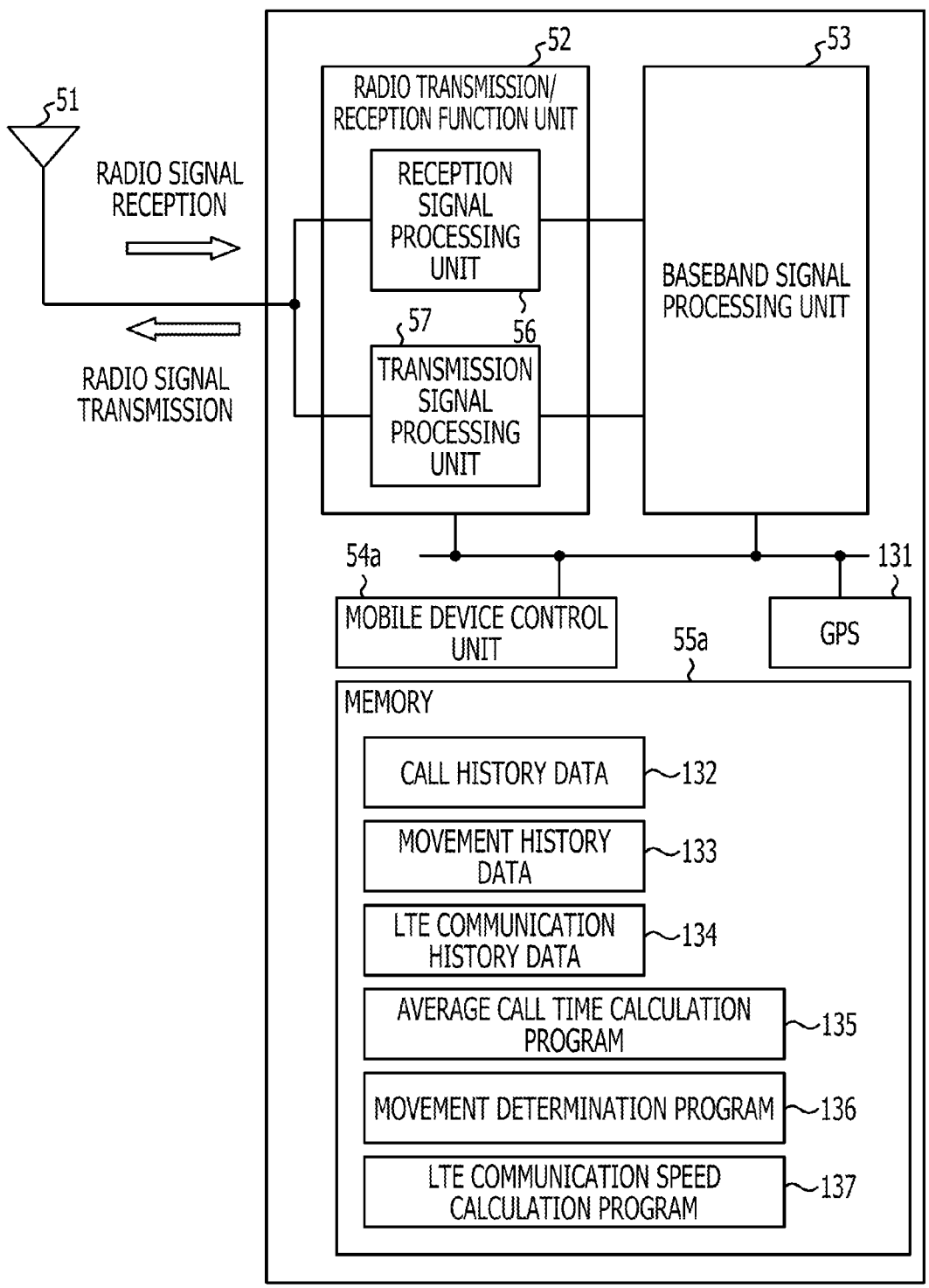
FIG. 14 is a hardware block diagram of a mobile device 8a according to a second embodiment.

FIG. 14 is a hardware block diagram of a mobile device 8*a* according to a second embodiment. According to the first embodiment, the eNB 6 performs the management of the call history in the 3G system and the movement determination of the mobile device 8. According to the second embodiment, the above-described processing is performed by the mobile device 8*a*, so that the data determining processing may be performed with high accuracy. As for the mobile device 8*a* illustrated in FIG. 14, the members equivalent to the mobile device 8 illustrated in FIG. 6 are indicated with the similar numbers, so that the description is omitted.

The mobile device 8*a* includes the antenna 51, the radio transmission/reception function unit 52, the baseband signal processing unit 53, a mobile device control unit 54*a*, a memory 55*a*, and a Global Positioning System (GPS) 131. The radio transmission/reception function unit 52 includes the reception signal processing unit 56 and the transmission signal processing unit 57.

The reception signal processing unit 56 and the transmission signal processing unit 57 are connected to the baseband signal processing unit 53. The radio transmission/reception function unit 52, the baseband signal processing unit 53, the mobile device control unit 54*a*, the memory 55*a*, and the GPS 131 are connected with each other by a bus. The radio transmission/reception function unit 52, the baseband signal processing unit 53, and the mobile device control unit 54 may be separate modules or a single module. Each of the modules may be achieved in an integrated circuit such as, for example, an ASIC or/and a processor such as, for example, a CPU or a DSP.

The GPS 131 measures location information of the mobile device 8*a*. The mobile device control unit 54*a* regularly obtains the location information measured by the GPS 131 and writes the location information into the memory 55*a*.

The mobile device control unit 54*a* achieves various functions by executing various programs stored in the memory 55*a*. The memory 55*a* includes a call history data 132, a movement history data 133, an LTE communication history data 134, an average call time calculation program 135, a movement determination program 136, and an LTE communication speed calculation program 137.

The call history data 132 represents call history information between the mobile device 8*a* and another mobile device. The call history information includes a call destination, a call time, and the like. The movement history data 133 represents location information of the GPS 131 for a certain period of time written by the mobile device control unit 54*a*. The LTE call history data 134 represents history information of a data communication speed in the LTE system.

The mobile device control unit 54*a* functions as an average call time calculating unit by executing the average call time calculation program 135. The mobile device control unit 54*a* functions as a mobile determining unit by executing the movement determination program 136. The mobile device control unit 54*a* functions as an LTE communication speed calculating unit by executing the LTE communication speed calculation program 137.

Based on the call history data 132, the average call time calculating unit calculates the past average call time between the mobile device 8*a* and the call destination corresponding to the call request signal. Based on the movement history data 133, the movement determining unit determines whether the mobile device 8*a* moves. Based on the LTE communication history data 134, the LTE communication speed calculating unit calculates a communication speed between the mobile device 8*a* and the eNB 6.

As described above, by executing various programs stored in the memory 55*a*, the mobile device control unit 54*a* in the mobile device 8*a* may transmit detail information used for the data transfer determination to the eNB 6.

Figure 15:
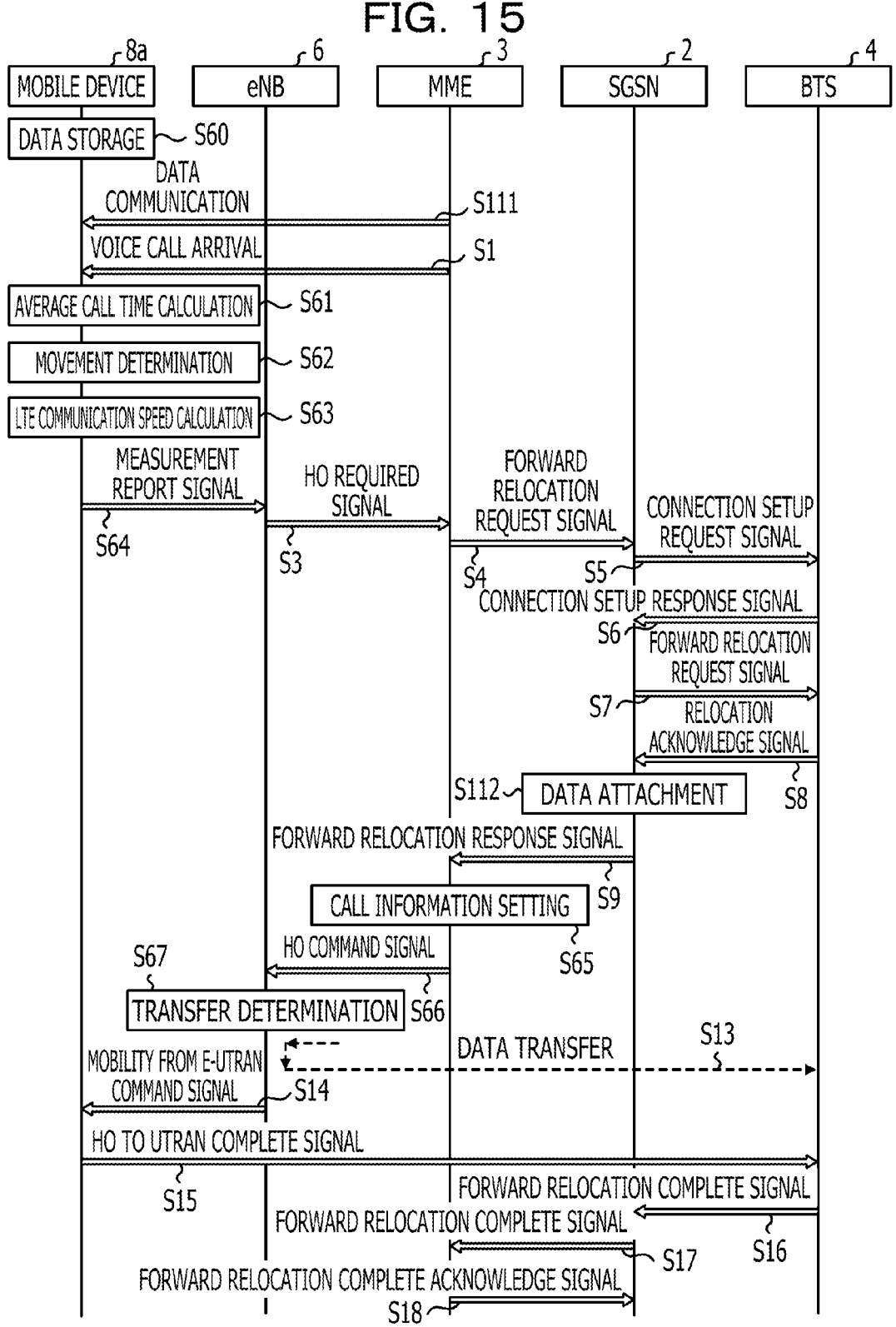
FIG. 15 is a sequence diagram of CS Fallback in the radio communication system 1 according to the second embodiment.

FIG. 15 is a sequence diagram of CS Fallback in the radio communication system 1 according to the second embodiment. As with FIG. 8, the sequence diagram illustrated in FIG. 15 illustrates the processing after the voice call arrives during the data transmission in the LTE system until the handover to the 3G system is completed.

In the sequence diagram illustrated in FIG. 15, the processing equivalent to FIG. 8 is indicated with the similar numerals, so that the description is omitted. In Operation S60, until the arrival of the voice call in Operation S1, the mobile device 8*a* writes the call history data 132, the movement history data 133, and the LTE communication history data 134 into the memory 55*a*.

When receiving the voice call from the MME 3 (S2), the mobile device 8*a* performs the average call time calculation processing (S61), the movement determining processing (S62), and the LTE communication speed calculating processing (S63). The mobile device 8*a* sets the average call time information, the movement determination result, and the LTE communication speed information to a measurement report signal and then transmits the measurement report signal to the eNB 6 (S64). The eNB 6 stores the various information received from the mobile device 8*a*.

The processing from Operation S3 to Operation S9 is equivalent to FIG. 8, so that the description is omitted. In Operation S65, the MME 3 performs call information setting processing of the call information that includes the call type information. The call information setting processing will be described in detail below.

The MME 3 transmits a handover (HO) command signal in which the call information having the call type information is set to the eNB 6 (S66). Based on the information included in the HO command signal and on the various information received from the mobile device 8*a* in Operation S64, the eNB 6 determines whether to transfer the data remaining in the eNB 6 to the BTS 4 (S67). Transfer inverting processing will be described in detail below. The processing from Operation S13 to Operation S18 is equivalent to FIG. 8, so that the description is omitted.

As described above, the radio communication system 1 may determine whether to transfer the data remaining in the eNB 6 to the BTS 4 based on the various information stored in the mobile device 8*a*.

FIG. 16 is a configuration diagram of a message signal that transmits the performance determination data of the data transfer processing in CS Fallback according to the second embodiment. FIG. 16A is a configuration diagram of a measurement report signal 170 that is transmitted from the mobile device 8*a* to the eNB 6. FIG. 16B is a configuration diagram of a handover (HO) command signal 100*a* that is transmitted from the MME 3 to the eNB 6. FIG. 16C is a configuration diagram of a mobility from E-UTRAN command signal 180 that is transmitted from the eNB 6 to the mobile device 8a. The configuration of the forward relocation response signal according to the second embodiment is equivalent to the forward relocation response signal 90 according to the first embodiment, so that the description is omitted.

In FIG. 16A, a data 77 represents information included in the existing measurement report signal. A data 78, a data 79, and a data 80 represent information that is newly added as part of the measurement report signal 170 according to the second embodiment. The data 78 represents information of the average call time calculated by the mobile device 8a. The data 79 represents information related to the movement presence/absence of the mobile device 8a that is determined by the mobile device 8a. The data 80 represents information of a communication speed in the LTE system calculated by the mobile device 8a. By receiving the measurement report signal 170, the eNB 6 may obtain the average movement time information, the movement presence/absence, and the LTE communication speed information.

In FIG. 16B, a data 74 represents information included in the existing HO command signal. According to the second embodiment, a data 75 and a data 76 represent information that is newly added as part of the HO command signal 100a. The data 75 represents call type information of a voice call as a target of the CS Fallback control. The data 76 represents maximum communication rate information in the communication of the 3G system between the BTS 4 as the handover destination and the mobile device 8. The data 75 and the data 76 are equivalent to the data 92 and the data 93 of the HO command signal 100 according to the first embodiment. By receiving the measurement report signal 170 illustrated in FIG. 16A and the HO command signal 100a illustrated in FIG. 16B, the eNB 6 may determine whether to transfer the data by the handover processing.

In FIG. 16C, a data 81 represents information included in the existing mobility from E-UTRAN command signal. A data 82 represents information that is newly added as part of the mobility from E-UTRAN command signal 180. The data 82 represents a data existence flag indicating the presence/absence of the data remaining in the memory 47 in the eNB 6 after the data transfer determining processing. By checking the received data presence/absence flag, the mobile device 8a may confirm whether the data remaining in the NB 6 exists after the CS Fallback processing.

Figure 17:
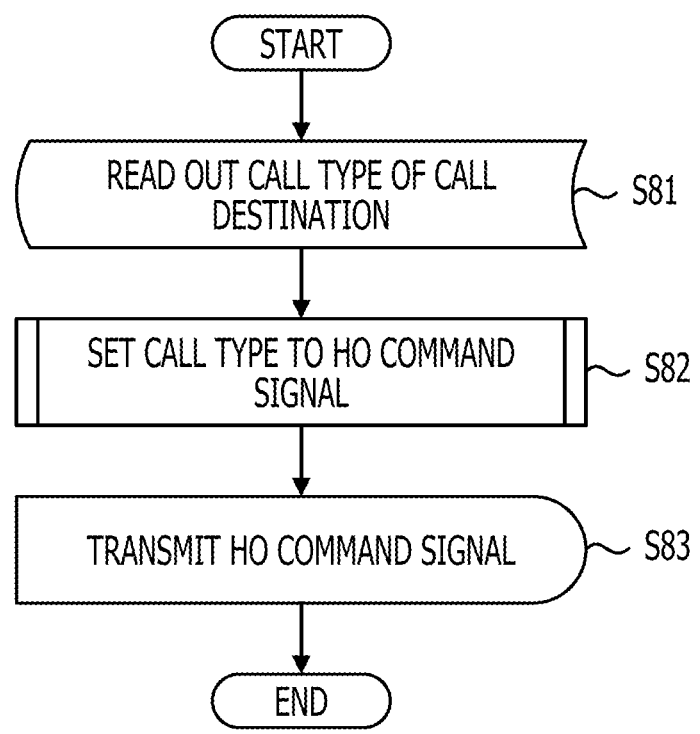
FIG. 17 is a flowchart of communication information setting processing in the MME 3.

FIG. 17 is a flowchart of the call information setting processing in the MME 3. The call information setting processing illustrated in FIG. 17 corresponds to Operation S65 illustrated in FIG. 15. The call information setting processing is achieved if the MME control unit 33 in the MME 3 executes the call time calculation program 110 stored in the memory 34. The call information setting processing may be achieved by executing part of the call time calculation program 110 according to the first embodiment or by a program performing simply the call information setting processing.

The MME control unit 33 reads out the call type of the call destination from the forward relocation response signal 90 received from the SGSN 2 (S81). The MME control unit 33 sets the read call type of the call destination to the HO command signal 100a (S82). The MME control unit 33 transmits the HO command signal 100a, in which the call type of the call destination is set, to the eNB 6 (S83).

As described above, based on the forward relocation response signal 90 received from the SGSN 2, the MME 3 may transmit the HO command signal 100a in which the call type of the call destination is set.

FIG. 18 is a flowchart of the data transfer determining processing in the eNB 6. The data transfer determining processing illustrated in FIG. 18 corresponds to Operation S67 illustrated in FIG. 15. The data transfer determining processing is achieved if the eNB control unit 46 in the eNB 6 executes a transfer determination program 102a stored in the memory 47. In FIG. 18, the processing operations equivalent to the transfer processing determination according to the first embodiment are indicated with the similar numbers.

The eNB control unit 46 reads out the information of the average call time 78, the movement presence/absence 79, and the LTE communication speed 80 from the measurement report signal 170 received from the mobile device 8a (S91). The eNB control unit 46 reads out the information of the call type 75 from the HO command signal 100a received from the MME 3 (S92). Based on the call type data 103 stored in the memory 47, the eNB control unit 46 determines whether the read call type 75 is an emergency call or a priority call (S32).

If the read call type 75 is an emergency call or a priority call (YES in S32), the eNB control unit 46 determines whether the data communication is congested (S41). If the data communication is congested (YES in S41), the eNB control unit 46 discards the transfer data 101 and ends the data transfer processing (S42). If the data communication is not congested (NO in S41), the eNB control unit 46 transfers the transfer data temporally stored in the memory 47 to the BTS 4 and then ends the data transfer processing (S43).

If the read call type is not an emergency call or a priority call (NO in S32), based on the data size of the transfer data 101 temporally stored in the memory 47 and the maximum communication rate 76 read out from the HO command signal 100a, the eNB control unit 46 calculates the communication time T1 of a case where the transfer data 101 is data-transmitted to the mobile device 8 in the 3G system (S33). Based on the data size of the transfer data 101 temporally stored in the memory 47 and the past communication rate in the LTE system, the eNB control unit 46 calculates the communication time T2 of a case where the transfer data 101 is data-transmitted to the mobile device 8 in the LTE system (S34).

If the communication time T1 in the 3G system is shorter than the communication time T2 in the LTE system (YES in S35), the eNB control unit 46 compares the communication time T1 to the average call time read out from the HO command signal 100a (S36). If the communication time T1 is shorter than the average call time (YES in S36), the eNB control unit 46 performs the data transfer processing (S43). If the communication time T1 is equal to or longer than the average call time (NO in S36), the eNB control unit 46 transfers the process to the processing in Operation S99.

If the communication time T1 on the 3G system side is equal to or longer than the communication time T2 on the LTE system side (NO in S35), the eNB control unit 46 compares the communication time T2 to the average call time read out from the HO command signal 100 (S37). If the communication time T2 is shorter than the average call time (YES in S37), the eNB control unit 46 performs the data transfer processing (S43). If the communication time T2 is equal to or longer than the average call time (NO in S37), the eNB control unit 46 transfers the process to the processing in Operation S99.

The eNB control unit 46 refers to the information of movement presence/absence read out from the measurement report signal 170 (S99). Based on the information of movement presence/absence of the mobile device 8a, if it is determined that the mobile device 8a moves between the cells (YES in S99), the eNB control unit 46 performs the data transfer processing (S43). If it is determined that the mobile device 8a does not move between the cells (NO in S99), the eNB control unit 46 starts the data transfer suppression control (S40). Here, the data transfer suppression control is performed to suppress the performance of the data transfer processing for a certain period of time. The eNB control unit 46 starts the data transfer suppression control and sets the timer 49 to measure the suppression time of the data transfer. The details of the data transfer suppression control are equivalent to the first embodiment.

After the data transfer determining processing, the eNB control unit 46 sets the flag, which indicates the presence/absence of the data remaining in the memory 47, as the data existence flag 82 to the mobility from E-UTRAN command signal 180 (S100). The eNB control unit 46 transmits the mobility from E-UTRAN command signal 180, in which the data presence/absence flag 82 is set, to the mobile device 8a.

As described above, based on the measurement report signal 170 received from the mobile device 8a and on the HO command signal 100a received from the MME 3, the eNB 6 may determine with higher accuracy whether to perform the data transfer processing to the BTS 4.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A base station, comprising:
   a memory which stores data to be transmitted to a mobile device, which complies with multiple communication methods and performs a data communication with the base station; and
   a processor which
   switches, during transmission of the data stored in the memory with one communication method of the multiple communication methods, when a communication request with another communication method of the multiple communication methods is transmitted to the mobile device, a communication partner to another base station complying with the other communication method, and
   determines whether to transfer an unsent data to the other base station based on a size relationship between a data transmission time to transmit the unsent data stored in the memory to the other base station and a communication time predicted based on a past communication history regarding a communication destination which transmits the communication request.

2. The base station according to claim 1, wherein when the communication partner is switched while the unsent data remains in the memory, the processor transfers the unsent data to the other base station when a communication with the other base station continues after a predetermined period of time elapses.

3. The base station according to claim 1, wherein the memory comprises a management table which stores a cell number to which the mobile device belongs for each event, and wherein the processor determines based on a change of the cell number for the event whether the mobile device moves and suppresses the data transfer to the other base station when the mobile device moves.

4. A control method for controlling a base station, the control method comprising:
   performing a data communication with a mobile device complying with multiple communication methods;
   switching, during transmission of the data to the mobile device with one communication method of the multiple communication methods, when a switch request to another communication method of the multiple communication methods is transmitted to the mobile device, a communication partner to another base station complying with the other communication method; and
   determining whether to transfer an unsent data to the other base station based on a size relationship between a data transmission time to transmit the unsent data stored in the memory to the mobile device from the other base station and a communication time predicted based on a past communication history regarding a communication destination which transmits the switch request.

5. The control method according to claim 4, comprising:
   when the communication partner is switched to the other base station while the unsent data remains in the memory, transferring the unsent data to the other base station when a communication between the mobile device and the other base station continues after a predetermined period of time elapses.

6. A radio communication system, comprising:
   a mobile device complying with multiple communication methods;
   a first base station which performs a communication by a first communication method of the multiple communication methods; and
   a second base station which performs the communication by a second communication method of the multiple communication methods;
   wherein the mobile device, comprising:
   a receiver which obtains location information;
   a mobile device memory which stores the location information at a time of the communication with the first base station;
   a mobile device processor which writes the location information, obtained from the receiver at the time of the communication with the first base station, into the mobile device memory, determines whether the mobile device moves based on the location information when there is a switch request to the second communication method from the first base station, and transmits a movement determination report to the first base station, and
   wherein the first base station, comprising:
   a base station memory which stores a block of data to be transmitted to the mobile device; and
   when the switch request to the second communication method is transmitted to the mobile device during transmission of the data stored in the base station memory, a base station processor which switches a communication partner to the second base station and suppresses the transmission of the unsent data stored in the base station memory to the second base station when the movement determination report received from the mobile device indicates that the mobile device moves.

7. The radio communication system according to claim 6, wherein when the communication partner is switched to the second base station while the unsent data remains in the base station memory, the base station processor transfers the unsent data to the second base station when the communication between the mobile device and the second base station continues after a predetermined period of time elapses.

8. The radio communication system according to claim 6, wherein the base station memory comprises a management table which stores a cell number to which the mobile device belongs for each event, and
  wherein the base station processor determines whether the mobile device moves based on a change of the cell number of the event and suppresses the data transfer to the second base station when the mobile device moves.

\* \* \* \* \*